United States Patent
Matsukuma et al.

(10) Patent No.: US 10,954,852 B2
(45) Date of Patent: *Mar. 23, 2021

(54) COMPRESSED AIR ENERGY STORAGE POWER GENERATION DEVICE

(71) Applicant: KOBE STEEL, LTD., Hyogo (JP)

(72) Inventors: Masaki Matsukuma, Takasago (JP); Ayaka Nagahira, Takasago (JP)

(73) Assignee: Kobe Steel, Ltd., Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/490,612

(22) PCT Filed: Mar. 23, 2018

(86) PCT No.: PCT/JP2018/011737
§ 371 (c)(1),
(2) Date: Sep. 3, 2019

(87) PCT Pub. No.: WO2018/181005
PCT Pub. Date: Oct. 4, 2018

(65) Prior Publication Data
US 2020/0018230 A1    Jan. 16, 2020

(30) Foreign Application Priority Data

Mar. 29, 2017  (JP) .............................. JP2017-066419

(51) Int. Cl.
*F02C 1/02*    (2006.01)
*H02J 15/00*   (2006.01)
(Continued)

(52) U.S. Cl.
CPC .................. *F02C 1/02* (2013.01); *F02C 1/05* (2013.01); *H02J 15/006* (2013.01); *F02C 6/16* (2013.01);
(Continued)

(58) Field of Classification Search
CPC ...... F02C 1/02; F02C 1/04; F02C 1/05; F02C 6/16; H02J 15/006; Y02E 20/14; F05D 2260/213; F05D 2260/42
See application file for complete search history.

(56) References Cited

U.S. PATENT DOCUMENTS

2007/0234749 A1* 10/2007 Enis ....................... F25B 27/00
                                                           62/238.2
2010/0205960 A1   8/2010 McBride et al.
(Continued)

FOREIGN PATENT DOCUMENTS

| GB | 2476489 A    | 6/2011 |
|----|--------------|--------|
| JP | H03-054325 A | 3/1991 |

(Continued)

OTHER PUBLICATIONS

The extended European search report issued by the European Patent Office dated Dec. 10, 2020, which corresponds to European Patent Application No. 18775085.6-1007 and is related to U.S. Appl. No. 16/490,612.

*Primary Examiner* — Mark A Laurenzi
*Assistant Examiner* — Xiaoting Hu
(74) *Attorney, Agent, or Firm* — Studebaker & Brackett PC

(57) ABSTRACT

This compressed air storage power generation device 10 is provided with: a power demand receiving unit 60 which receives in real-time the power demand value of consumer equipment 3; a power supply adjustment device 19 which adjusts the amount of power generated by a generator 15; and a control device which has a power generation amount control unit 17a for controlling the power supply adjustment device 19 so as to supply the consumer equipment 3 in a timely fashion with power corresponding to the power demand value received by the power demand receiving unit 60.

7 Claims, 6 Drawing Sheets

(51) Int. Cl.
*F02C 6/16* (2006.01)
*F02C 1/05* (2006.01)

(52) U.S. Cl.
CPC .... *F05D 2260/213* (2013.01); *F05D 2260/42* (2013.01)

(56) References Cited

U.S. PATENT DOCUMENTS

| | | | |
|---|---|---|---|
| 2014/0159371 A1* | 6/2014 | Hugo | F03D 9/28 290/54 |
| 2018/0156110 A1* | 6/2018 | Matsukuma | F02C 1/04 |
| 2018/0266315 A1 | 9/2018 | Kubo et al. | |
| 2018/0347459 A1 | 12/2018 | Matsukuma et al. | |

FOREIGN PATENT DOCUMENTS

| | | | | |
|---|---|---|---|---|
| JP | H04-191419 A | 7/1992 | | |
| JP | H06-193998 A | 7/1994 | | |
| JP | 2008-061382 A | 3/2008 | | |
| JP | 2015-012717 A | 1/2015 | | |
| JP | 2016-211402 A | 12/2016 | | |
| JP | 2016-211515 A | 12/2016 | | |
| WO | 2016/181841 A1 | 11/2016 | | |
| WO | WO-2016178358 A1 * | 11/2016 | | F02C 6/16 |

* cited by examiner

COMPRESSED AIR ENERGY STORAGE POWER GENERATION DEVICE

TECHNICAL FIELD

The present disclosure relates to a compressed air energy storage power generation device.

BACKGROUND ART

Since power generation utilizing renewable energy such as wind power generation or photovoltaic power generation depends upon meteorological conditions, the output may be unstable. Therefore, in order to obtain necessary power in a timely manner, there is a need to use an energy storage system. As an example of such a system, for example, a compressed air energy storage (CAES) power generation device is known.

The CAES power generation device is a device in which a compressor is driven by means of renewable energy to produce compressed air, the compressed air is stored in a tank or the like, and a turbine power generator is driven by using the compressed air when needed to obtain power. Such a CAES power generation device is disclosed, for example, in Patent Document 1.

CITATION LIST

Patent Document

Patent Document 1: JP 2016-211466 A

SUMMARY OF THE INVENTION

Problem to be Solved by the Invention

In Patent Document 1, the configuration of a general CAES system is disclosed, but a system for detecting a power demand from a supply destination (consumer facility) of power and supplying necessary power in a timely manner is not discussed in detail.

The embodiments of the present invention have been made in these circumstances and an object thereof is to supply power required by a consumer facility in a timely manner by using a compressed air energy storage power generation system.

Means for Solving the Problem

A compressed air energy storage power generation system according to an embodiment of the present invention is a compressed air energy storage power generation device capable of accumulating renewable energy in a form of compressed air, generating power by using the compressed air as necessary, and supplying power to a consumer facility, including: a power demand receiving unit which receives a power demand value of the consumer facility in real-time; an electric motor driven by power generated by use of the renewable energy; a compressor driven by the electric motor; a pressure accumulation unit which accumulates the compressed air compressed by the compressor; an expander driven by the compressed air supplied from the pressure accumulation unit; a power generator driven by the expander; a power adjustment unit which adjusts the amount of power generated by the power generator; and a control device having a power generation amount control unit which controls the power adjustment unit so as to supply the power according to the power demand value received by the power demand receiving unit to the consumer facility in a timely manner.

According to this configuration, energy whose output is irregularly fluctuating such as renewable energy can be stored in the pressure accumulation unit as compressed air, and power can be generated by supplying the compressed air to the expander when needed and driving the power generator. Moreover, the power demand value of the consumer facility is received in real-time by the power demand receiving unit, and therefore it is possible to understand, in real-time, power the compressed air energy storage (CAES) power generation device should generate. Further, the power adjustment unit is controlled by the power generation amount control unit, and power generation according to the power demand value is performed, and therefore it is possible to supply necessary power to the consumer facility in a timely manner. Moreover, if each consumer is located far away from a main power generation facility such as a thermal power plant or a nuclear power plant, there is a need to install large-scale transmission system. In contrast, the CAES power generation device is capable of being installed at any place, so can be installed in the vicinity of each consumer, and large-scale transmission system becomes unnecessary Thus, the present device is particularly effective in the case where the consumer facility is located far away from the main power generation facility such as a thermal power Plant or a nuclear power plant. Moreover, the CAES power generation device is excellent in environmental properties because of discharging no environmental hazard substance, and has a longer service life compared to other power generation facilities or power storage facilities and is also excellent in durability.

The power adjustment unit may include an air supply capacity adjustment valve for adjusting the supply amount of the compressed air from the pressure accumulation unit to the expander; and the power generation amount control unit of the control device may adjust the opening degree of the air supply capacity adjustment valve according to the power demand value and adjust the power generation amount of the power generator.

According to this configuration, the opening degree of the air supply capacity adjustment valve is adjusted according to the power demand value, and therefore it is possible to generate the amount of power required by the consumer facility in a timely manner.

The power adjustment unit may further include a rotational speed changing device for changing rotational speed of the power generator; and the power generation amount control unit of the control device may adjust the rotational speed of the power generator by the rotational speed changing device according to the power demand value and adjust the power generation amount of the power generator.

According to this configuration, the rotational speed of the power generator is adjusted by the rotational speed changing device according to the power demand value, and therefore it is possible to generate the amount of power required by the consumer facility in a timely manner.

A plurality of the expanders may be provided; the power adjustment unit may further include an operating number changing device for changing operating number of the expanders; and the power generation amount control unit of the control device may adjust the number of the expanders to be driven by the operating number changing device according to the power demand value and adjust the power generation amount of the power generator.

According to this configuration, the driving number of the expanders is adjusted by the operating number changing device according to the power demand value, and therefore it is possible to generate the amount of power required by the consumer facility in a timely manner.

The compressed air energy storage power generation device may further include: a cold heat demand receiving unit which receives a cold heat demand value of the consumer facility; a first heat exchanger which cools a first heat medium by exchanging heat between the first heat medium and cold air exhausted from the expander; a first heat medium storage unit which stores as cold heat the first heat medium cooled in the first heat exchanger; and a cold heat adjustment unit which adjusts the supply amount of the cold heat from the first heat medium storage unit to the consumer facility, and the control device may further have a cold heat supply control unit which controls the cold heat adjustment unit so as to supply the cold heat according to the cold heat demand value received by the cold heat demand receiving unit to the consumer facility in a timely manner.

According to this configuration, the first heat medium can be cooled in the first heat exchanger by use of the cold air exhausted from the expander, and the cooled first heat medium can be stored in the first heat medium storage unit. Moreover, the cold heat demand value of the consumer facility is received by the cold heat demand receiving unit, and therefore it is possible to understand cold heat required by the consumer facility. Then, the cold heat adjustment unit is controlled by the cold heat supply control unit, and necessary cold heat can be supplied to the consumer facility in a timely manner according to the cold heat demand value. Moreover, by supplying cold heat together with power, energy efficiency of the system is improved. A coefficient of performance COP which is one of indicators of energy efficiency is defined at a ratio of the output power energy and heat energy to the input power energy, and therefore compared to the case where only power is supplied, COP can be improved by an amount of energy of the cold, heat.

The compressed air energy storage power generation device may further include: a hot heat demand receiving unit which receives a hot heat demand value of the consumer facility; a second heat exchanger which heats a second heat medium by exchanging heat between the second heat medium and air discharged from the compressor; a second heat medium storage unit which stores as hot heat the second heat medium heated in the second heat exchanger; and a hot heat adjustment unit which adjusts the supply amount of the hot heat from the second heat medium storage unit to the consumer facility, and the control device may further have a hot heat supply control unit which controls the hot heat adjustment unit so as to supply the hot heat according to the hot heat demand value received by the hot heat demand receiving unit to the consumer facility in a timely manner.

According to this configuration, the second heat medium can be heated in the second heat exchanger by use of the hot air discharged from the compressor, and the heated second heat medium can be stored in the second heat medium storage unit. Moreover, the hot heat demand value of the consumer facility is received by the hot heat demand receiving unit, and therefore it is possible to understand hot heat required by the consumer facility. Then, the hot heat adjustment unit is controlled by the hot heat supply control unit, and necessary hot heat can be supplied to the consumer facility in a timely manner according to the hot heat demand value. Moreover, by supplying hot heat together with power, energy efficiency of the system can be improved. That is, compared to the case where only power supplied, COP can be improved by an amount of energy of the hot heat.

Effect of the Invention

According to the embodiments of the present invention, in the compressed air energy storage system, the power demand value is detected in real-time, and therefore it is possible to understand, in real-time, power required by the consumer facility.

DESCRIPTION OF EMBODIMENTS

Figure 1:
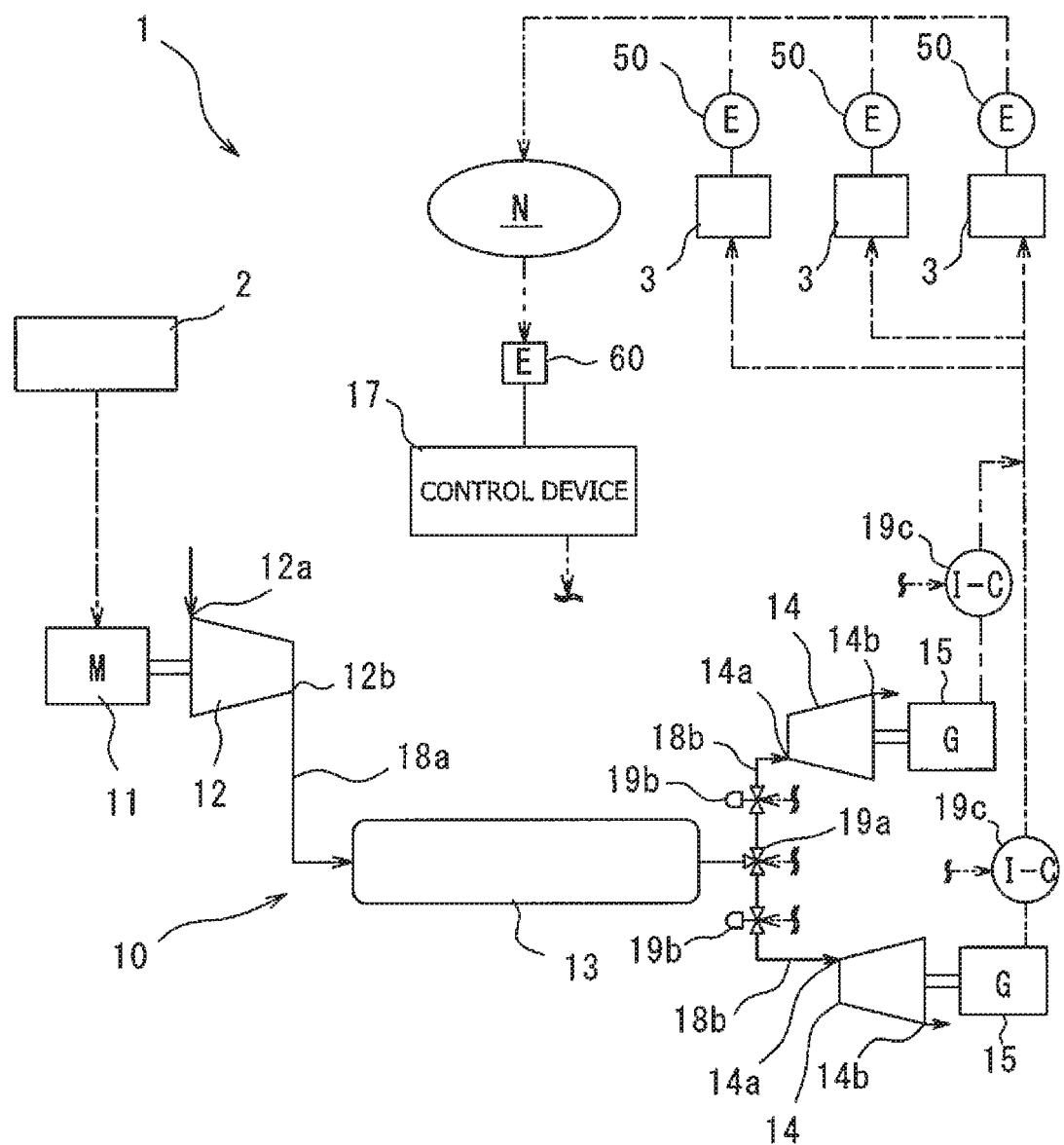
FIG. 1 is a schematic configuration diagram of a compressed air energy storage power generation device according to a first embodiment of the present invention.

Hereinafter, referring to the accompanying drawings, embodiments of the present invention will be described.

First Embodiment

A compressed air energy storage (CAES) power generation system 1 is a system for accumulating, in a form of compressed air, power generated in a power generation device 2 utilizing renewable energy such as wind power generation or photovoltaic power generation, generating power by using the compressed air as necessary, and supplying power to a consumer facility 3 in a timely manner. Here, the form of the consumer facility 3 may be various, for example, such as each home or a factory. Three consumer facilities 3 are drawn in FIG. 1, but the number thereof may be arbitrary.

The CAES power generation system 1 includes a CAES power generation device 10, and a power demand detection unit 50 capable of transmitting data via a communication network N to the CAES power generation device 10.

The CAES power generation device 10 includes a motor (an electric motor) 11, a compressor 12, a pressure accumulation tank (pressure accumulation unit) 13, an expander 14, a power generator 15, and a control device 17.

The power generated by the power generation device 2 utilizing renewable energy is supplied to the motor 11. Hereinafter, power supplied to the motor 11 from the power generation device 2 is referred to as input power. The motor 11 is mechanically connected to the compressor 12, and is driven by input power and operates the compressor 12.

The compressor 12 of the present embodiment is a screw type. The screw compressor 12 is capable of controlling rotational speed, and therefore can follow irregularly fluctuating input power with high responsiveness and is preferable as a component of the CAM power generation device 10. However, the type of the compressor 12 is not particularly limited, and in addition to a screw type, a scroll type, a turbo type, a reciprocating type or the like may be possible.

When driven by the motor 11, the compressor 12 suctions air from a suction port 12a, and compresses it and discharges the compressed air from a discharge port 12b. The discharge port 12b of the compressor 12 is fluidly connected to the pressure accumulation tank 13 through an air pipe 18a, and the compressed air discharged from the discharge port 12b is pressure-fed to the pressure accumulation tank 13. In addition, in the present embodiment, one compressor 12 is installed, but the installation number is not particularly limited and may be plural.

The pressure accumulation tank 13 is, for example, a steel tank, and accumulates the compressed air pressure-fed from the compressor 12. The pressure accumulation tank 13 is fluidly connected respectively to air supply ports 14a of the two expanders 14 through an air pipe 18b branching in two directions via a switching valve 19a, and the compressed air accumulated in the pressure accumulation tank 13 is selectively supplied to the two expanders 14 through the air pipe 18b. The switching valve 19a is controlled by a control device 17 as will be described later. In the air pipe 18b branching in two directions, air supply capacity adjustment valves 19b which is flow regulating valves are interposed respectively. The opening degree of the two air supply capacity adjustment valves 19b is controlled respectively by the control device 17 described later. In addition, the switching valve 19a is an example of an operating number changing device.

The two expanders 14 of the present embodiment are the same, and are a screw type. The screw expander 14 is capable of controlling rotational speed, and therefore is preferable as a component of the CAES power generation device 10 as with the aforementioned screw compressor 12. However, the type of the expander 14 is not particularly limited, and in addition to a screw type, a scroll type, a turbo type, a reciprocating type or the like may be possible. The expander 14 is mechanically connected to the power generator 15. Therefore, when the compressed air is supplied from the air supply port 14a, the expander 14 is operated by the supplied compressed air, and drives the power generator 15. That is, the compressed air stored in the pressure accumulation tank 13 is expanded and utilized for power generation. The expanded air is exhausted from an exhaust port 14b.

The power generator 15 is electrically connected to the consumer facility 3 via an inverter 19c, and the power generated by the power generator 15 is supplied to the consumer facility 3. Hereinafter, the power supplied to the consumer facility 3 from the power generator 15 is referred to as output power. Moreover, in the present embodiment, by the inverter 19c, the rotational speed of the power generator 15 can be adjusted and the amount of output power can be adjusted. The inverter 19c of the present embodiment has also a function as a converter, and output power is subjected to conversion including DC-AC conversion to desired voltage and frequency by the inverter 19c and thereafter supplied to the consumerfacility 3. The inverter 19c is controlled by the control device 17 as will be described later. In addition, the inverter 19c is an example of a rotational speed changing device.

To the consumer facility 3, the power demand detection unit 50 is mounted, and detects the power required by the consumer facility 3 in real-time. The form of the power demand detection unit 50 is not particularly limited, and it may be, for example, the one which calculates a power demand value from the usage amount of power in each home, the usage amount of power in a factory, or the like. The power demand value is transmitted to a power demand receiving unit 60 from the power demand detection unit 50 via the communication network N, and is used for control described later in the control device 17.

Figure 2:
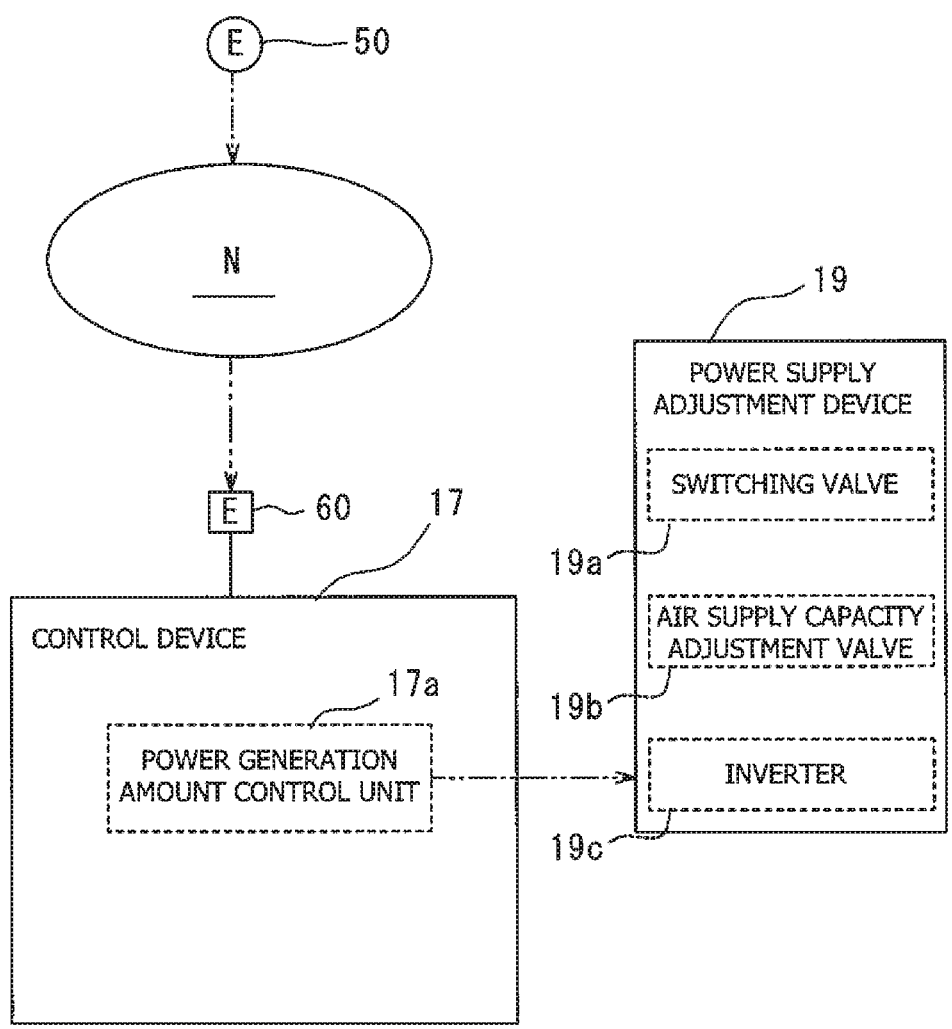
FIG. 2 is a control block diagram of the compressed air energy storage power generation device according to the first embodiment.

Referring also to FIG. 2, the CAES power generation device 10 includes the control device 17 and the power demand receiving unit 60. The control device 17 is constructed by a hardware including a memory such as a CPU (Central Processing Unit), a RAM (Random Access Memory) and a ROM (Read Only Memory), and a software implemented thereon. The control device 17 is electrically connected to the power demand receiving unit 60. The power demand receiving unit 60 is a receiver which receives an electrical signal about a power demand value transmitted from the power demand detection unit 50 via the communication network N. Receiving the power demand value, the control device 17 controls the power supply adjustment device 19. Specifically, the power supply adjustment device 19 is controlled by a power generation amount control unit 17a of the control device 17.

The power generation amount control unit 17a of the present embodiment controls the power supply adjustment device 19 consisting of three elements of the switching valve 19a, the air supply capacity adjustment valve 19b, and the inverter 19c and adjusts a generated power amount.

Firstly, the power generation amount control unit 17a adjusts the opening degree of the air supply capacity adjustment valve 19b and drives the power generator 15. Concretely, if the power demand value is larger than the current output power, the opening degree of the air supply capacity adjustment valve 19b is increased, and more compressed air is supplied to the expander 14 and the power generation amount of the power generator 15 is increased. If the power demand value detected by the power demand detection unit 50 is smaller than the current output power, the opening degree of the air supply capacity adjustment valve 19b is reduced, and less compressed air is supplied to the expander 14 and the power generation amount of the power generator 15 is reduced.

Secondly, the power generation amount control unit 17a adjusts the rotational speed command value of the inverter 19c and drives the power generator 15. Concretely, if the power demand value is larger than the current output power, the rotational speed command value is increased, the rotational speed of the power generator 15 is increased, and the power generation amount of the power generator 15 is increased. If the power demand value detected by the power demand detection unit 50 is smaller than the current output power, the rotational speed command value is reduced, the rotational speed of the power generator 15 is reduced, and the power generation amount of the power generator 15 is reduced.

Thirdly, the power generation amount control unit 17a adjusts the operating number of the expanders 14 by switching the switching valve 19a, and drives the power generator 15. Concretely, if the power demand value is larger than the current output power, outlets of the switching valve 19a are opened in two directions, and drives two expanders 14, thereby increasing the power generation amount of the power generator 15. If the power demand value detected by the power demand detection unit 50 is smaller than the current output power, one or all of the outlets of the switching valve 19a is/are closed, and one expander 14 is driven or not driven, thereby reducing the power generation amount of the power generator 15.

Adjustment of the generated power amount may be performed by independently performing control of each of the switching valve 19a, the air supply capacity adjustment valve 19b and the inverter 19c, or by performing a combination of control of those after giving a priority order. In addition, rotational speed control of the power generator 15 is not limited to control by the inverter 19c, and may be preformed in any forms. Similarly, operating number control of the expanders 14 is not limited to control by the switching valve 19a, and may be performed in any forms. Particularly, the number of the expanders 14 is up to two in the present embodiment, but may be three or more.

According to the present embodiment, energy whose output is irregularly fluctuating such as renewable energy can be stored in the pressure accumulation tank 13 as compressed air, and power can be generated by supplying the compressed air to the expander 14 when needed and driving the power generator 15. Moreover, the power demand value of the consumer facility 3 is received in real-time by the power demand receiving unit 60, and therefore it is possible to understand, in real-time, power the CAM power generation device 10 should generate. Further, the power supply adjustment device 19 is controlled by the power generation amount control unit 17a, and power generation according to the power demand value is performed, and therefore it is possible to supply necessary power to the consumer facility 3 in a timely manner. Moreover, if each consumer facility 3 is located far away from a main power generation facility such as a thermal power plant or a nuclear power plant, there is a need to install large-scale transmission system. In contrast, the CAES power generation device 10 is capable of being installed at any place, so can be installed in the vicinity of each consumer facility 3, and large-scale transmission system becomes unnecessary. Thus, the present device 10 is particularly effective in the case where each consumer facility 3 is located far away from the main power generation facility such as a thermal power plant or a nuclear power plant. Moreover, the CAES power generation device 10 is excellent in environmental properties because of discharging no environmental hazard substance, and has a longer service life compared to other power generation facilities and is also excellent in durability.

Moreover, the power supply adjustment device 19 is adjusted according to the power demand value, and therefore it is possible to generate the amount of power required by the consumer facility 3 in a timely manner.

As thus described, by installing the CAES power generation device 10 in a place far away from the main power generation facility and requiring timely power supply, the CAES power generation system 1 is a so-called "local production for local consumption" which can consume renewable energy in the installed area on site. Particularly, in recent years, a FIT system (feed-in tariff system) is established, and there is a case where each home or the like generates power by use of renewable energy or the like and consumes power in each home, and transmits excess power (that is, an electric power company buys it). However, if large-scale power generation and power transmission beyond a scale of power generation in each home are performed, there is a fear that reverse flow in the existing weak transmission system is caused and the transmission system fails. In contrast, the CAES power generation system 1 of the present em embodiment can define the power generation amount, and therefore failure of the transmission system can be prevented even if power transmission is performed using the existing weak transmission system.

Second Embodiment

Figure 3:
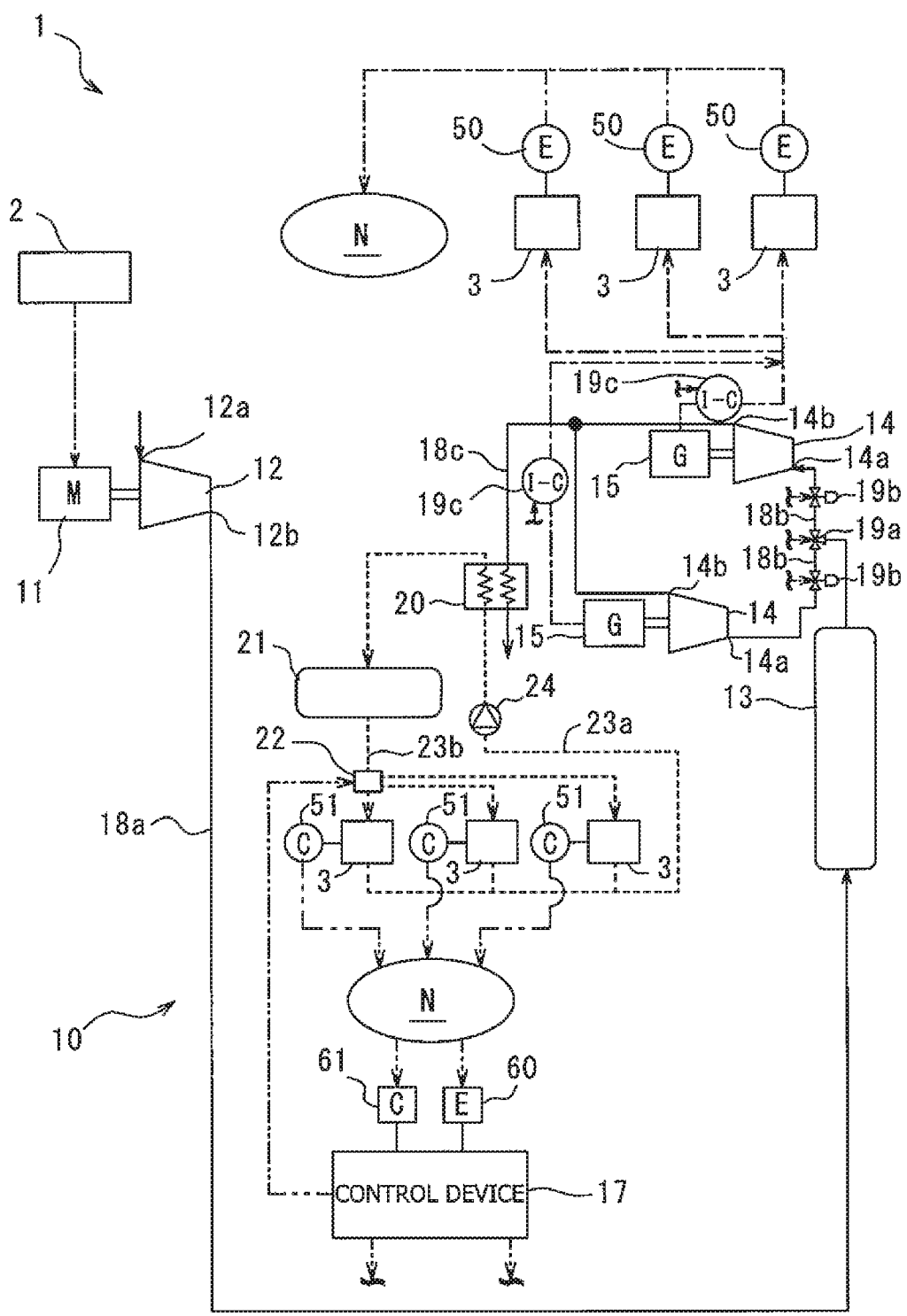
FIG. 3 is a system diagram of the compressed air energy storage power generation device according to a second embodiment.

The CAES power generation system 1 of a second embodiment shown in FIG. 3 has a cold heat supply function in addition to a power supply function of the CAES power generation system 1 of the first embodiment in FIG. 1. The CAES power generation system 1 of the present embodiment is substantially the same as the configuration of the first embodiment in FIG. 1 except for the configuration as to the cold heat supply function. Thus, the portions same as the configuration shown in FIG. 1 are denoted by the same reference numerals, and descriptions thereof will be omitted.

The CAES power generation device 10 of the present embodiment includes a first heat exchanger 20, a first heat medium storage unit 21, and a cold heat supply adjustment valve (cold heat adjustment unit) 22. These are fluidly connected to the consumer facility 3 by heat medium pipes 23a, 23b, and a first heat medium circulates therebetween through the heat medium pipes 23a, 23b. Moreover, in the heat medium pipe 23a, a pump 24 for circulating the first heat medium is arranged. In addition, the type of the first heat medium is not particularly limited, and may be, for example, water.

The first heat exchanger 20 is fluidly connected to the exhaust ports 14b of the two expanders 14 through an air pipe 18c extending therefrom and joining thereto, and air exhausted from the exhaust ports 14b of the expanders 14 is supplied to the first heat exchanger 20. Here, the air exhausted from the exhaust ports 14b of the expanders 14 is cold air of normal temperature or less because its heat is absorbed when it is expanded in the expander 14. In the present embodiment, the air exhausted from the exhaust ports 14h of the expanders 14 is, for example, cold air of around −50° C.

In the first heat exchanger 20, heat is exchanged between cold air in the air pipe 18c and the first heat medium of normal temperature in the heat medium pipe 23a. Specifically, in the first heat exchanger 20, air the air pipe 18c is heated, and the first heat medium in the heat medium pipe 23a is cooled. In the present embodiment, the air heated in the first heat exchanger 20 is of, for example, around 20° C., and the first heat medium cooled in the first heat exchanger 20 is of, for example, around 5° C. After heat exchange in the first heat exchanger 20, the air heated in the first heat exchanger 20 is exhausted to the atmosphere, and the first heat medium cooled in the first heat exchanger 20 is supplied to the first heat medium storage unit 21 through the heat medium pipe 23a and stored therein.

The first heat medium storage unit 21 is, for example, a cold water pool, and it is preferable to be insulated from the outside so as not to release cold heat to the outside. The first heat medium storage unit 21 is fluidly connected to the consumer facility 3 through the heat medium pipe 23b, and in the heat medium pipe 23b, the cold heat supply adjustment valve 22 which is a flow regulating valve is interposed. Therefore, the first heat medium stored in the first heat medium storage unit 21 is supplied as cold heat to the consumer facility 3 via the cold heat supply adjustment valve 22. Moreover, the cold heat supply adjustment valve 22 of the present embodiment also serves as a distributor.

To the consumer facility 3, a cold heat demand detection unit 51 is mounted, and a cold heat demand value of the consumer facility 3 can be detected. The form of the cold heat demand detection unit 51 is not particularly limited, and it may be, for example, the one which calculates a cold heat demand value from the usage amount of air conditioning installation in each home, the usage amount of cold water in a factory, or the like. Furthermore, the cold heat demand value may be detected in real-time, or may be calculated in batch from the usage amount of cold heat in a past certain period. The cold heat demand value is transmitted to a cold heat demand receiving unit 61 from the cold heat demand detection unit 51 via the communication network N, and is used for control described later in the control device 17.

Figure 4:
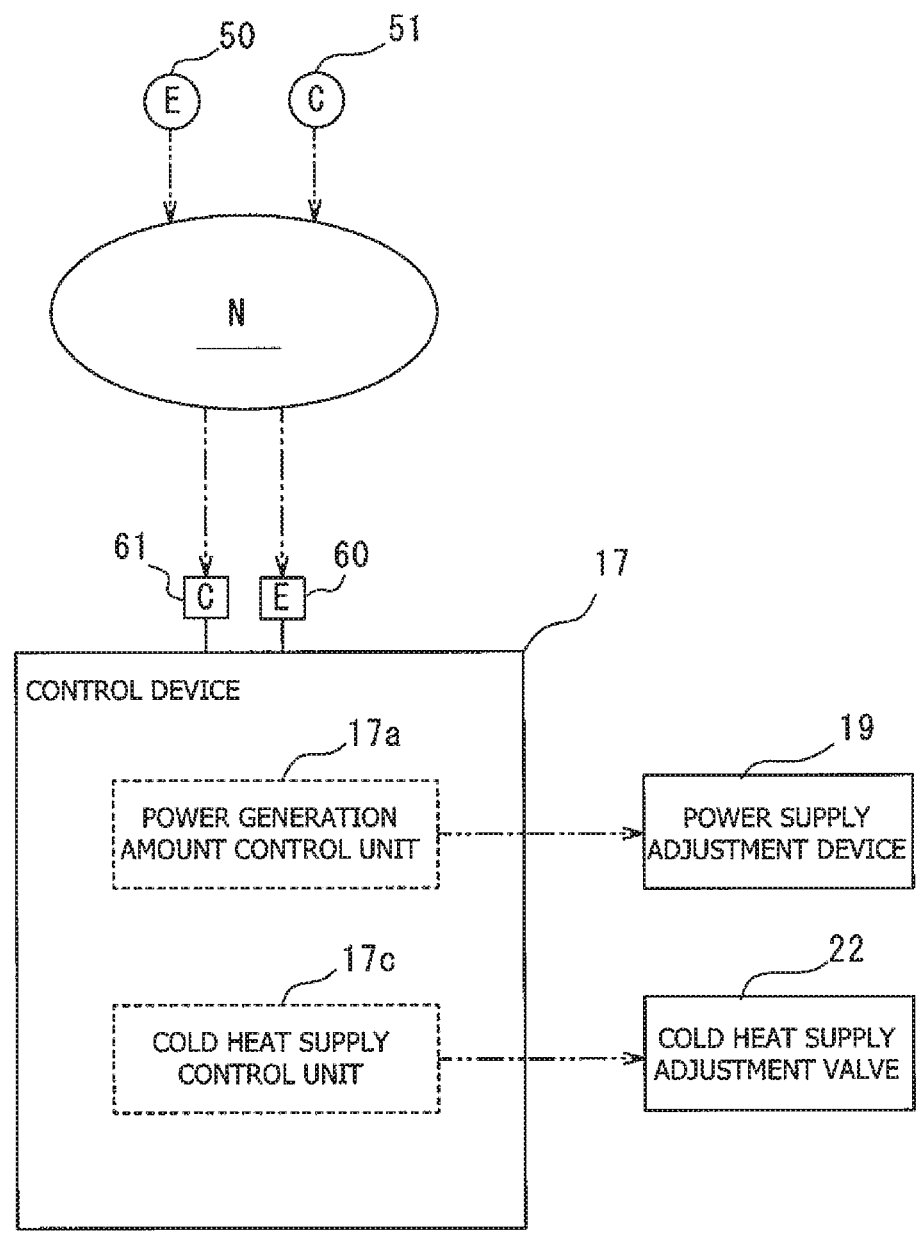
FIG. 4 is a control block diagram of the compressed air energy storage power generation device according to the second embodiment.

As shown also in FIG. 4, the control device 17 has a cold heat supply control unit 17c which controls the cold heat supply adjustment valve 22 so as to supply necessary cold heat according to the cold heat demand value received by the cold heat demand receiving unit 61 to the consumer facility 3 in a timely manner.

According to the cold heat demand value detected by the cold heat demand detection unit 51 and received by the cold heat demand receiving unit 61, the cold heat supply control unit 17c adjusts the opening degree of the cold heat supply adjustment valve 22 and supplies required amount of cold heat to the consumer facility 3. Concretely, if the cold heat demand value is larger than the current supplying cold heat amount, the opening degree of the cold heat supply adjustment valve 22 is increased, and the cold heat supply amount is increased. Moreover, if the cold heat demand value is smaller than the current supplying cold heat amount, the opening degree of the cold heat supply adjustment valve 22 is reduced, and the cold heat supply amount is reduced.

According to the present embodiment, the first heat medium can be cooled in the first heat exchanger 20 by use of the cold air exhausted from the expander 14, and the cooled first heat medium can be stored in the first heat medium storage unit 21. Moreover, the cold heat demand value is received by the cold heat demand receiving unit 61, and therefore it is possible to understand cold heat required by each consumer facility 3. Then, the cold heat supply adjustment valve 22 is controlled by the cold heat supply control unit 17c, and necessary cold heat can be supplied to each consumer in a timely manner according to the cold heat demand value. Moreover, by supplying cold heat together with power, energy efficiency of the system is improved. A coefficient of performance COP which is one of indicators of energy efficiency is defined at a ratio of the output power energy and heat energy to the input power energy, and therefore compared to the case where only power is supplied, COP can be improved by an amount of energy of the cold heat.

Third Embodiment

Figure 5:
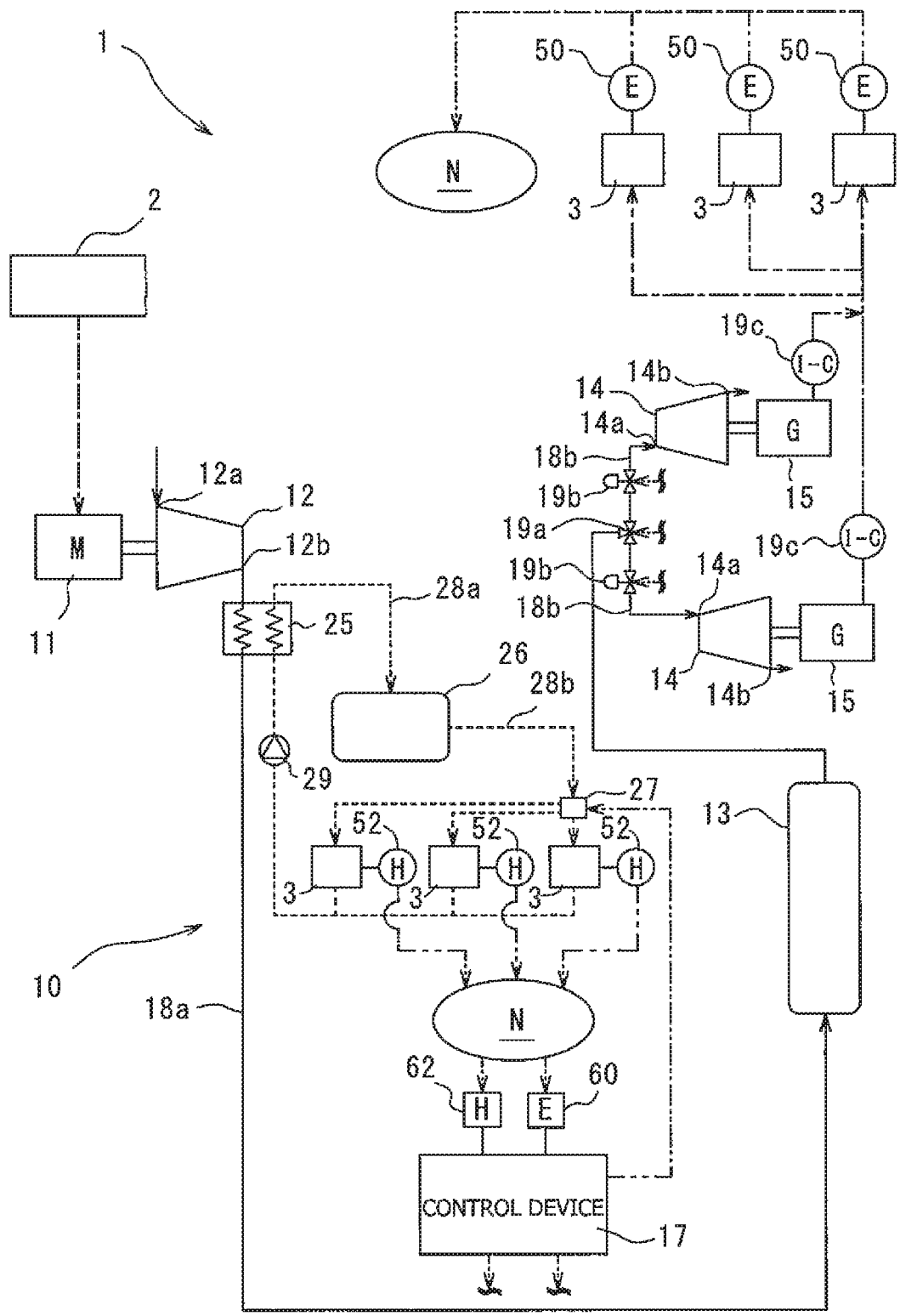
FIG. 5 is a system diagram of the compressed air energy storage power generation device according to a third embodiment.

The CAES power generation system 1 of a third embodiment shown in FIG. 5 has a hot heat supply function in addition to the power supply function of the CAES power generation device 10 of the first embodiment in FIG. 1. The CAES power generation system 1 of the present embodiment is substantially the same as the configuration of the first embodiment in FIG. 1 except for the configuration as to the hot heat supply function. Thus, the portions same as the configuration shown in FIG. 1 are denoted by the same reference numerals, and descriptions thereof will be omitted.

The CAES power generation device 10 of the present embodiment includes a second heat exchanger 25, a second heat medium storage unit 26, and a hot heat supply adjustment valve (hot heat adjustment unit) 27. These are fluidly connected to the consumer facility 3 by heat medium pipes 28a, 28b, and a second heat medium circulates therebetween through the heat medium pipes 28a, 28b. Moreover, in the heat medium pipe 28a, a pump 29 for circulating the second heat medium is arranged. In addition, the type of the second heat medium is not particularly limited, and may be, for example, water.

The second heat exchanger 25 is interposed in the air pipe 18a extending from the discharge port 12b of the compressor 12 to the pressure accumulation tank 13. The compressed air discharged from the discharge port 12b of the compressor 12 is air of normal temperature or more because its temperature is raised due to heat of compression when it is compressed in the compressor 12. In the present embodiment, the compressed air discharged from the exhaust port 12b of the compressor 12 is, for example, hot air of around 155° C.

In the second heat exchanger 25, heat is exchanged between hot air in the air pipe 18a and the second heat medium of normal temperature in the heat medium pipe 28a. Specifically, in the second heat exchanger 25, air in the air pipe 18a is cooled, and the second heat medium in the heat medium pipe 28a is heated. In the present embodiment, the air in the air pipe 18a cooled in the second heat exchanger 25 is of, for example, around 50° C., and the second heat medium heated in the second heat exchanger 25 is of, for example, around 90° C. After heat exchange in the second heat exchanger 25, the air cooled in the second heat exchanger 25 is supplied to the pressure accumulation tank 13 and stored therein, and the second heat medium heated in the second heat exchanger 25 is supplied to the second heat medium storage unit 26 through the heat medium pipe 28a and stored therein.

The second heat medium storage unit 26 is, for example, a hot water pool, and it is preferable to be insulated from the outside so as not to release hot heat to the outside. The second heat medium storage unit 26 is fluidly connected to each consumer facility 3 through the heat medium pipe 28b, and in the heat medium pipe 28b, the hot heat supply adjustment valve 27 which is a flow regulating valve is interposed. Therefore, the second heat medium stored in the second heat medium storage unit 26 is supplied as hot heat to each consumer facility 3 via the hot heat supply adjustment valve 27. Moreover, the hot heat supply adjustment valve 27 of the present embodiment also serves as a distributor.

To the consumer facility 3, a hot heat demand detection unit 52 is mounted, and a hot heat demand value of the consumer facility 3 can be detected. The form of the hot heat demand detection unit 52 is not particularly limited, and it may be, for example, the one which calculates a hot heat demand value from the usage amount of air conditioning installation in each home, the usage amount of hot water in a factory, or the like. Furthermore, the hot heat demand value may be detected in real-time, or may be calculated in batch from the usage amount of hot heat in a past certain period. The hot heat demand value is transmitted to a hot heat demand receiving unit 62 from the hot heat demand detection unit 52 via the communication network N, and is used for control in the control device 17.

Figure 6:
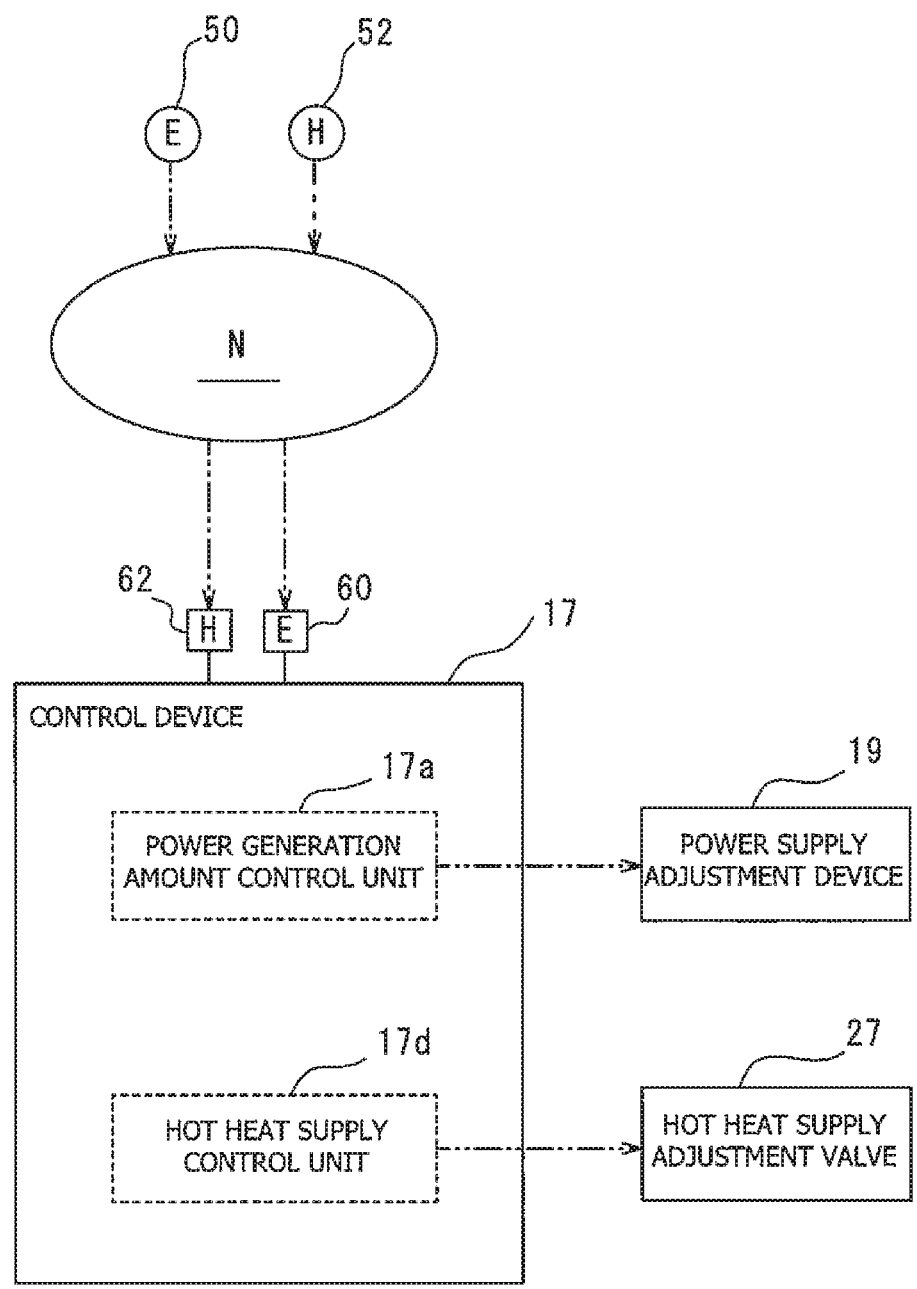
FIG. 6 is a control block diagram of the compressed air energy storage power generation device according to the third embodiment.

As shown also in FIG. 6, the control device 17 has a hot heat supply control unit 17d which controls the hot heat supply adjustment valve 27 so as to supply necessary hot heat according to the hot heat demand value received by the hot heat demand receiving unit 62 to each consumer facility 3 in a timely manner.

According to the hot heat demand value detected by the hot heat demand detection unit 52 and received by the hot heat demand receiving unit 62, the hot heat supply control unit 17d adjusts the opening degree of the hot heat supply adjustment valve 27 and supplies required amount of hot heat to the consumer facility 3. Concretely, if the hot heat demand value is larger than the current supplying hot heat amount, the opening degree of the hot heat supply adjustment valve 27 is increased, and the hot heat supply amount is increased. Moreover, if the hot heat demand value is smaller than the current supplying hot heat amount, the opening degree of the hot heat supply adjustment valve 27 is reduced, and the hot heat supply amount is reduced.

According to the present embodiment, the second heat medium can be heated in the second heat exchanger 25 by use of the hot air discharged from the compressor 12, and the heated second heat medium can be stored in the second heat medium storage unit 26. Moreover, the hot heat demand value is received by the hot heat demand receiving unit 62, and therefore it is possible to understand hot heat required by each consumer facility 3. Then, the hot heat supply adjustment valve 27 is controlled by the hot heat supply control unit 17d, and necessary hot heat can be supplied to each consumer facility 3 in a timely manner according to the hot heat demand value. Moreover, by supplying hot heat together with power, energy efficiency of the system can be improved. That is, compared to the case where only power is supplied, COP can be improved by an amount of energy of the hot heat.

In the embodiments described herein, power generation by renewable energy can be intended for all those utilizing energy which is routinely (or iteratively) replenished by the forces of nature such as, for example, wind power, sunlight, solar heat, wave power or tidal power, flowing water or tide and is irregularly fluctuating.

Hereinbefore, although the specific embodiments of the present invention have been described, the present invention is not limited to the above modes, and can be embodied by variously changing the modes within the gist of the present invention. For example, the mode made by appropriately combining the contents of the individual embodiments may be used as one embodiment of the present invention.

EXPLANATION OF REFERENCE NUMERALS

1: Compressed air energy storage (CAES) power generation system
2: Power generation device
3: Consumer facility
10: Compressed air energy storage (CAES) power generation device
11: Motor (Electric motor)
12: Compressor
12a: Suction port
12b: Discharge port
13: Pressure accumulation tank (Pressure accumulation unit)
14: Expander
14a: Air supply port
14b: Exhaust port
15: Power generator
17: Control device
17a: Power generation amount control unit
17c: Cold heat supply control unit
17d: Hot heat supply control unit
18a, 18b, 18c: Air pipe
19: Power supply adjustment device (Power adjustment unit)
19a: Switching valve (Operating number changing device)
19b: Air supply capacity adjustment valve
19c: Inverter (Rotational speed changing device)
20: First heat exchanger
21: First heat medium storage unit
22: Cold heat supply adjustment valve (Cold heat adjustment unit)
23a, 23b: Heat medium pipe
24: Pump
25: Second heat exchanger
26: Second heat medium storage unit
27: Hot heat supply adjustment valve (Hot heat adjustment unit)
28a, 28b: Heat medium pipe
29: Pump
50: Power demand detection unit
51: Cold heat demand detection unit
52: Hot heat demand detection unit
60: Power demand receiving unit
61: Cold heat demand receiving unit
62: Hot heat demand receiving unit

The invention claimed is:

1. A compressed air energy storage power generation device capable of accumulating renewable energy in a form of compressed air, generating power by using the compressed air as necessary, and supplying power to a consumer facility, comprising:
a power demand receiving unit which receives a power demand value of the consumer facility in real-time;
an electric motor driven by power generated by use of the renewable energy;
a compressor driven by the electric motor;
a pressure accumulation unit which accumulates the compressed air compressed by the compressor;
an expander driven by the compressed air supplied from the pressure accumulation unit;
a power generator driven by the expander;
a power adjustment unit which adjusts the amount of power generated by the power generator;
a control device having a power generation amount control unit which controls the power adjustment unit so as to supply the power according to the power demand value received by the power demand receiving unit to the consumer facility in a timely manner;
a cold heat demand receiving unit which receives a cold heat demand value of the consumer facility;
a first heat exchanger which cools a first heat medium by exchanging heat between the first heat medium and cold air exhausted from the expander;
a first heat medium storage unit which stores as cold heat the first heat medium cooled in the first heat exchanger; and
a cold heat adjustment unit which adjusts the supply amount of the cold heat from the first heat medium storage unit to the consumer facility;
wherein the control device further has a cold heat supply control unit which controls the cold heat adjustment unit so as to supply the cold heat according to the cold heat demand value received by the cold heat demand receiving unit to the consumer facility in a timely manner.

2. The compressed air energy storage power generation device according to claim 1, wherein
the power adjustment unit includes an air supply capacity adjustment valve for adjusting the supply amount of the compressed air from the pressure accumulation unit to the expander; and
the power generation amount control unit of the control device adjusts the opening degree of the air supply capacity adjustment valve according to the power demand value and adjusts the power generation amount of the power generator.

3. The compressed air energy storage power generation device according to claim 2, wherein
the power adjustment unit further includes a rotational speed changing device for changing rotational speed of the power generator; and
the power generation amount control unit of the control device adjusts the rotational speed of the power generator by the rotational speed changing device according to the power demand value and adjusts the power generation amount of the power generator.

4. The compressed air energy storage power generation device according to claim 2, wherein
a plurality of the expanders are provided;
the power adjustment unit further includes an operating number changing device for changing operating number of the expanders; and
the power generation amount control unit of the control device adjusts the number of the expanders to be driven by the operating number changing device according to the power demand value and adjusts the power generation amount of the power generator.

5. The compressed air energy storage power generation device according to claim 2, further comprising:
a hot heat demand receiving unit which receives a hot heat demand value of the consumer facility;
a second heat exchanger which heats a second heat medium by exchanging heat between the second heat medium and air discharged from the compressor;
a second heat medium storage unit which stores as hot heat the second heat medium heated in the second heat exchanger; and
a hot heat adjustment unit which adjusts the supply amount of the hot heat from the second heat medium storage unit to the consumer facility,
wherein the control device further has a hot heat supply control unit which controls the hot heat adjustment unit so as to supply the hot heat according to the hot heat demand value received by the hot heat demand receiving unit to the consumer facility in a timely manner.

6. The compressed air energy storage power generation device according to claim 1, wherein
the power adjustment unit further includes a rotational speed changing device for changing rotational speed of the power generator; and
the power generation amount control unit of the control device adjusts the rotational speed of the power generator by the rotational speed changing device according to the power demand value and adjusts the power generation amount of the power generator.

7. The compressed air energy storage power generation device according to claim 1, wherein
a plurality of the expanders are provided;
the power adjustment unit further includes an operating number changing device for changing operating number of the expanders; and
the power generation amount control unit of the control device adjusts the number of the expanders to be driven by the operating number changing device according to the power demand value and adjusts the power generation amount of the power generator.

* * * * *